2,507,952
Patented Apr. 21, 1970

3,507,952
SUSTAINED RELEASE BOLUS FOR
ANIMAL HUSBANDRY
Alvin B. Rednick, Cherry Hill, N.J., and Stanley J.
Tucker, Philadelphia, Pa., assignors to Smith
Kline & French Laboratories, Philadelphia, Pa., a
corporation of Pennsylvania
Continuation-in-part of application Ser. No. 526,750,
Feb. 11, 1966. This application Dec. 20, 1968, Ser.
No. 785,567
Int. Cl. A61k 27/12, 9/00; A61j 3/10
U.S. Cl. 424—22
14 Claims

ABSTRACT OF THE DISCLOSURE

Veterinary sustained release dosage forms which remain in the rumeno-reticular sac of an animal over an extended period of time and in which the therapeutically active substance has a predictable and controlled release pattern. The compositions comprise a dense filler, a therapeutically active substance and a critical amount of a lubricant.

---

Figure 1:
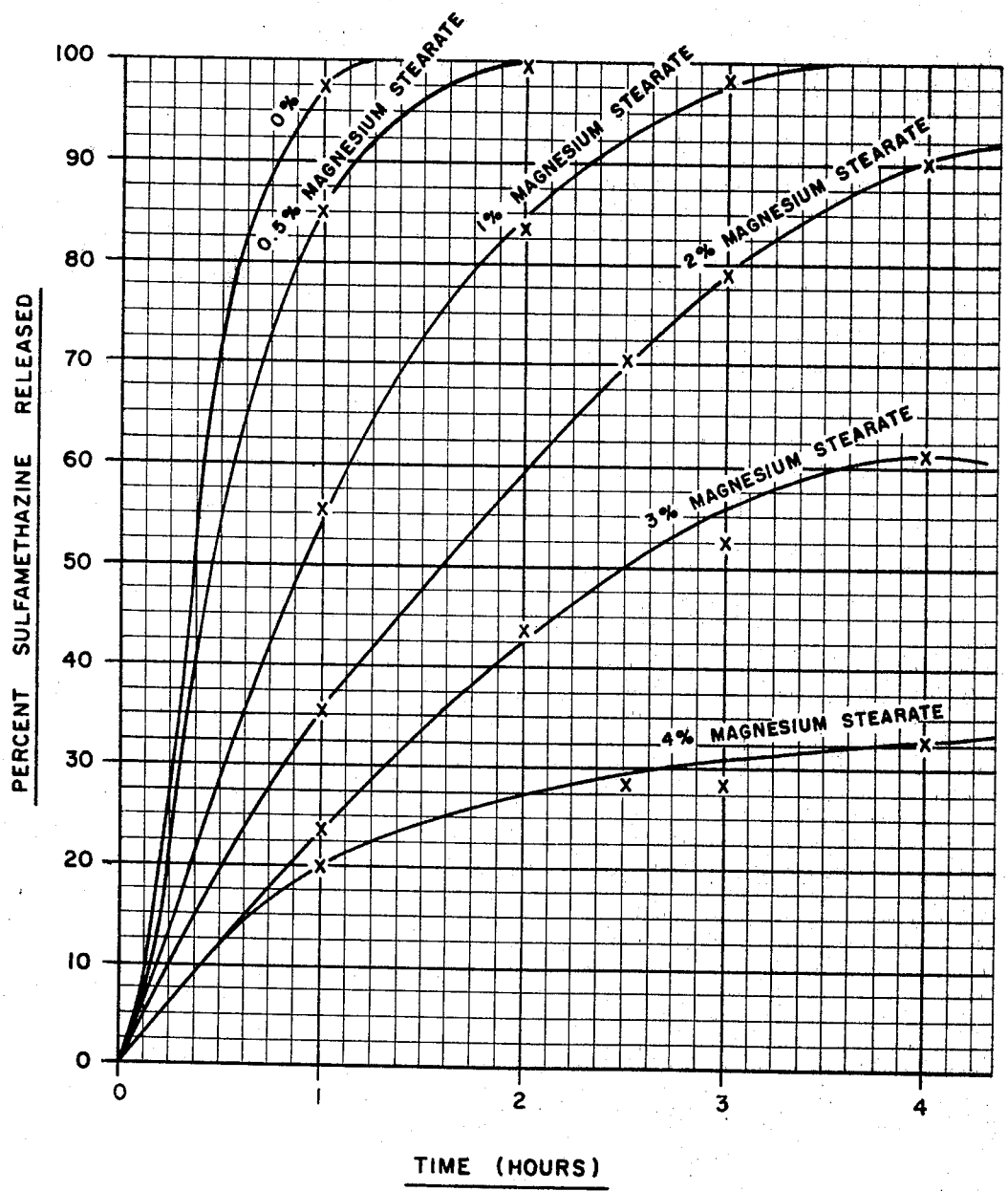

This is a continuation-in-part application based on our copending application Ser. No. 526,750 filed Feb. 11, 1966, now abandoned.

This invention relates to sustained release dosage forms to be employed in veterinary practice, particularly for the administration of therapeutic substances to ruminants such as cattle and sheep. More specifically this invention relates to bolus like dosage forms intended to remain in the rumeno-reticular sac of an animal over an extended period of time and which give off a controlled sustained release of a therapeutically active substance. Veterinary boluses are large tablet like unit dosages usually oblong in shape. This shape is desired for ease of administration to ruminants by use of a device known as a bolling gun. Because of their large size, the conventional tablet technology does not always apply to the preparation of boluses.

In the veterinary field, sustained release dosage forms of medication which remain in the rumeno-reticular sac for a prolonged period are known to the patent art although not commonly in commercial use. These dosage forms are in the form of a bolus or pellets and are dense and heavy enough to stop in the rumeno-recticular sac and remain there rather than pass into the alimentary tract and be eliminated intact. The physical form of these dosage forms is retained over a long period of time in the sac while the therapeutically active substance is slowly released by erosive or solubilization action within the rumeno-reticular sac. In other words, regardless of the therapeutically active substance to be administered, the bolus itself must comply with the physical requirements as to density and weight. In order to meet the proper requirements for density and weight, iron or any other relatively high density matrix may be employed in the preparation of the bolus.

A major disadvantage of the above sustained release preparation is that the release of the therapeutically active substance from the pellet or bolus is unpredictable and not controllable. This very unpredictable delay in release of the active substance from the bolus in turn fails to be beneficial to the animals. The therapeutically active substance should be released at whatever rate is appropriate to produce the desired effect.

A generally similar type of veterinary bolus or pellet is described in the patent literature, such as, for example, in United States Patent No. 3,056,724. The patent discloses pellets for administration to ruminants which provide biologically active substances over an extended period of time. In the case of trace elements given in pellet form, the patent states that the elements will last in an animal in excess of one year. In the case of therapeutic substances such as, for example, a sulfonamide or antibiotic medication, it would be possible to provide a level of three months or more. This prolonged medication is desired in order to prevent retardation of growth and development of the animal, more of a prophylactic type of medication rather than curative. In brief, the patent states that the inventors could control the release of a substance from the pellets anywhere from several weeks to over a year.

Control over the rate of release is accomplished by varying the firing temperature used in the preparation of these prior art pellets. Too low a firing temperature yields a friable pellet which disintegrates in the rumen too quickly. Heating to a high temperature causes a reaction to take place which binds the mixture into a hard porous mass. The 3,056,724 patent states that the preferred procedure is preparing the pellets and then baking them at a suitable temperature.

The above noted prior art method which employs extremely high temperatures to heat pellets intended to remain in the rumeno-reticular sac of animals for a prolonged period of time is also disclosed in British patent specification 936,386. The type of prolonged medication provided by this process, i.e., from several weeks to in excess of one year, is desirable when treating animals to assist in their development and growth.

However, there is one major veterinary problem which the procedure outlined in the above noted patents does not solve. This involves giving an animal a therapeutic dose of a medicament which should be clear of the animal tissues by a certain time. For example, when dealing with food producing ruminants, any medication given should be essentially clear of the tissues before the animals are slaughtered. Instead of having the medication remain for months or a year as taught by the prior art, it is often necessary to dose a sick animal several weeks before slaughtering with a sulfonamide, antibiotic or other such medicament. A sustained release type of medication which should essentially clear the animal tissues by a specific time is desirable in this case. Therefore, a veterinary bolus having a predictable, controlled sustained release and which will disintegrate in the rumen in up to about ten days and assure virtual clearance of the medicament from the animal tissues in approximately three weeks is required.

The prior art method of preparing pellets by baking or applying high temperatures will not produce the desired relatively short term controlled release of the medicament. The baking or heating process fuses the granules together and prevents the disintegration of the tablet for a very prolonged period. This, in turn, binds the medication in the tablet. The problem therefore is to prepare a bolus which still maintains a sustained release effect but will disintegrate and release the medicament in a predictable, controlled fashion.

It is therefore the object of the present invention to provide a sustained release bolus which remains in the rumeno-reticular sac for a controlled extended period of time and in which the therapeutic substance present in the bolus also has a controlled sustained release pattern over this period.

It is a further object of this invention to provide a sustained release veterinary bolus which can be administered to food producing ruminants for therapeutic effect several weeks before slaughtering and in which the medicament present will be essentially clear of the animal tissues at the time of slaughtering.

We have found that by the process of this invention controlled release veterinary boluses for relatively short term therapeutic effects can be prepared without the baking step of the prior art and by control of an ingredient which had never before been recognized as critical in the manufacture of boluses, i.e., the lubricant. The method and compositions of this invention therefore solve the prior art disadvantages of unpredictable release and extremely long term effect by simplifying the prior art procedure to fill a commercial need of a bolus with a relatively short term effect, for example, a maximum of three weeks but preferably up to ten days.

The composition in accordance with this invention comprises a bolus containing a therapeutically active substance combined with a filler and a critical lubricant. More specifically, the filler is a material dense and heavy enough to permit the bolus to lodge in the rumeno-reticular sac of an animal. It has unexpectedly been found that the lubricant must be present in critical proportions which permit a controlled, predictable sustained release of the therapeutically active substance in a relatively short time basis.

It has been unexpectedly discovered that when a lubricant is employed in the manufacture of the bolus in certain critical percentage ranges that a definite predictable sustained release pattern is achieved. In order to achieve this sustained release pattern of the therapeutic substance, the lubricant material should be present from about 1% to about 3.5% by weight of the total solids. The use of these critical amounts of lubricant permits for the disintegration of the bolus within approxiamtely ten days and virtual clearance of the medicament from the animal tissues in approximately three weeks.

The accompanying graphs represent results of both in vitro and in vivo tests conducted on the same basic formulation for sulfamethazine boluses. The only difference in the composition of the boluses in each test is the varying amounts of magnesium stearate present. The same compressional force was applied in preparing the boluses. The purpose of these tests was to demonstrate the criticality of the percentage ranges noted above for the lubricant.

Figure 2:
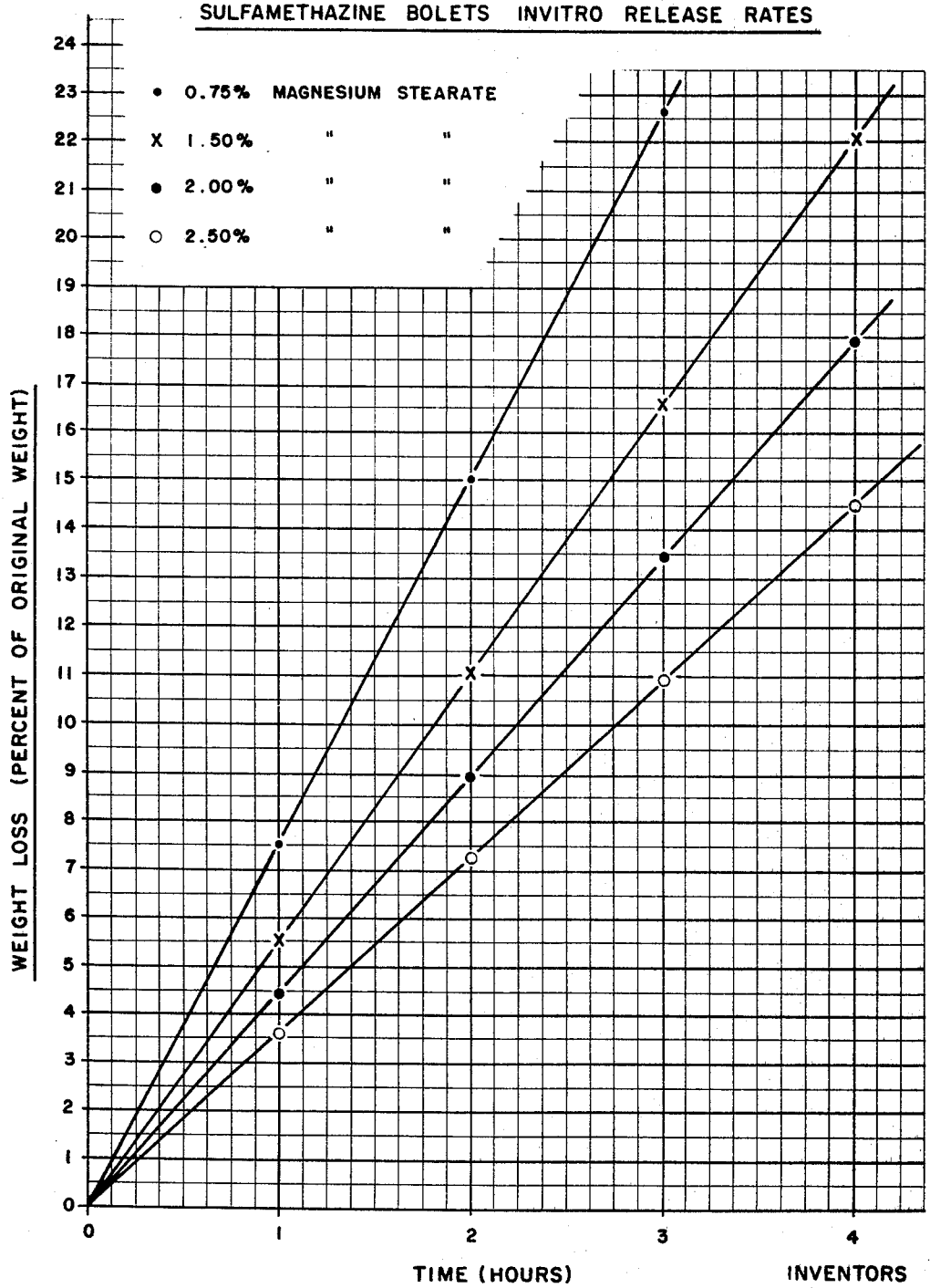

FIGURES 1 and 2 represent results of in vitro testing. These in vitro tests were conducted using a procedure similar to the United States Pharmacopeia XVI tablet disintegration test. FIGURE 1 reveals the percent of sulfamethazine released while FIGURE 2 represents the weight loss of the bolus at different time intervals of the disintegration test.

Figure 3:
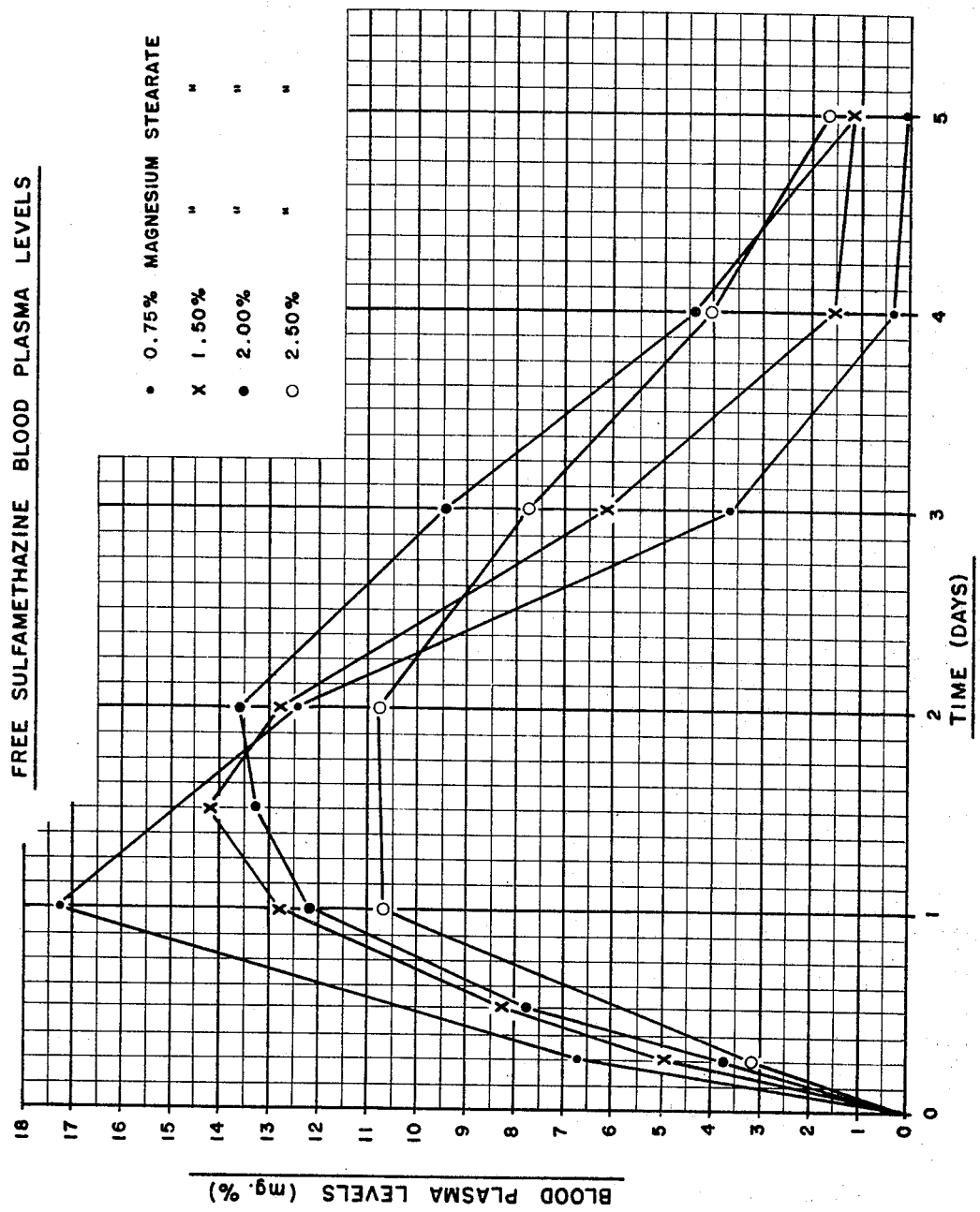

FIGURE 3 represents the result of in vivo testing. The in vivo tests were conducted by orally dosing calves with boluses in which the calves received 120 mg. of sulfamethazine per pound of body weight. Blood samples were taken at various time intervals and tested for free sulfamethazine.

Referring specifically to FIGURE 1, it can be seen that when the lubricant is present up to 0.5% all of the sulfamethazine is released in two hours. This release is much too rapid for sustained release medication. When the magnesium stearate is present in an amount of 4% or more, it can be seen that only 32% of the sulfamethazine is released from the bolus in four hours with an apparent leveling off of the release. This rate of release would be much too slow to give the necessary blood levels for proper sustained release treatment of the animal. In other words, when the lubricant was present in an amount of 0.5%, the sulfamethazine released too fast and when 4% magnesium stearate showed approximately 4 mg. percent leased too slowly. The critical range of the magnesium stearate present in the bolus was therefore found to be from about 1% to about 3.5%.

In FIGURE 2 it will be noted that when 0.75% magnesium stearate is present, the bolus loses approximately 23% of its original weight in three hours. When the same formulation contains 2.5% of magnesium stearate, it can be seen that there is only an 11% weight loss. In brief, when the amount of magnesium stearate was increased from 0.75% to 2.5%, it was possible to reduce the loss of bolus weight, i.e., disintegration rate, by one-half the amount in the same time period.

The in vivo results disclosed in FIGURE 3 essentially correlate the in vitro results. For example, it can be seen that at the end of three days the bolus containing 0.75 percent magnesium stearate showed approximately 4 mg. percent of free sulfamethazine in the blood plasma. When the concentration of magnesium strearate is raised to 2.5% in the same formulation, approximately 8.5 mg. percent of free sulfamethazine is present in the blood plasma. Here again it is demonstrated that the amount of lubricant present is critical. Increasing the percentage of magnesium stearate from 0.75% to 2.5% not only resulted in twice the amount of free sulfamethazine in the blood plasma at the end of three days but more important, it gave a more prolonged sustained release effect. For example, it will be noted that at the end of five days the bolus containing 0.75% magnesium stearate produces no free sulfamethazine in the blood plasma while the bolus containing 2.5% shows approximately 2 mg. percent of sulfamethazine present.

The formulas employed in these tests and method of preparation for the boluses are set forth hereinafter as Examples 1 and 4. The basic formula set forth in Example 4 was used to obtain both the in vitro data of FIGURE 2 and in vivo data of FIGURE 3.

The critical lubricant employed in the compositions of this invention can be any of the more common tablet water insoluble lubricants such as, for example, magnesium stearate, sodium stearate, calcium stearate, powdered stearic acid, talc, paraffin, cocoa butter, graphite, lycopodium or combinations thereof. The preferred lubricants are fatty acid derived especially the stearates such as, for example, magnesium stearate, sodium stearate, calcium stearate and stearic acid.

This invention is useful with any solid medicament which it is desired to provide in sustained release form. The medicament may be in the form of a base, salt or ester and may be soluble or insoluble in nature. Thus, for example, the medicament may be a sulfonamide derivative such as sulfamethazine or sulfathiazine, a tranquilizer such as chlorpromazine, an antibiotic such as, chloramphenicol, tetracycline or penicillin, an anthelmintic such as piperazine phosphate, an anti-bloat agent such as organopoly siloxanes, hormone growth supplements such as stilbestrol and many more medicaments such as vitamins and those used in the treatment of bacterial enteritis such as furazolidone.

Exemplary of the dense filers which may be employed as a matrix are iron powder, calcium sulfate, dihydrate, portland cement, plaster of paris, magnesium oxychloride cement, zinc oxychloride cement and zinc oxyiodide cement or mixtures thereof. Most advantageously the dense filler will be iron powder. The filler will be present from about 5% to about 95% by weight of the total solids. Preferably the filler will be present from about 25% to about 75%.

If binders are necessary to insure adequate cohesiveness of the bolus natural gums and gum constituents, such as, for example, acacia, tragacanth, agar and pectin may be employed. Further, exemplary of binders would be, for example, cellulose esters, polyvinylpyrrolidone and proteinaceous material such as, for example, gelatin, casein and zein.

It will be evident to one skilled in the tableting art that the binder is a standard pharmaceutical tool commonly used and is not an essential aspect of this invention, therefore the amount of binder used can be varied.

The method of preparing the sustained release bolus compositions in accordance with this invention comprises first granulating the mixed powders of filler and therapeutically active substance. The granules are then screened and the desired amount of lubricant is mixed into the granulation. The boluses are compressed using the desired shape punches and die with the conventional tableting machines.

The final product comprises a mixture of a therapeutically active substance, a dense inert filler and from 1% to about 3.5% of a lubricant which has been compressed into a bolus. The bolus provides for a sustained release of the medicament having a smooth and controlled release pattern. The finished bolus will weigh anywhere from about 1.0 gram to 50 grams and have a density up to 8.0. Advantageously the finished bolus will weigh from about 5 grams to about 40 grams and have a density of about 1.5 to 5.0.

The bolus can comprise many shapes such as, for example, cylindrical, oval, spherical, capsule shaped, triangular shaped or domed shaped.

The invention will be further clarified by the following specific examples. These examples are not limiting but are used to make obvious to one skilled in the art the full practice of this invention.

EXAMPLE 1

| Ingredients: | Grams/bolus |
| --- | --- |
| Sulfamethazine | 22.5 |
| Reduced iron | 11.25 |
| Magnesium stearate | 00.70 |
| Gelatin solution 10%. | |

The sulfamethazine and iron are mixed and then wetted with the 10% gelatin solution. The wetted powders are passed through a #6 screen and dried at 120° F. overnight. The dried granules are then passed through a #14 screen and mixed with the magnesium stearate. The boluses are then compressed using cylindrical-dome shaped punches and die. The finished bolus weighs 35.15 grams.

EXAMPLE 2

| Ingredients: | Grams/bolus |
| --- | --- |
| Furazolidone | 3.640 |
| Reduced iron | 3.640 |
| Calcium sulfate dihydrate | 5.000 |
| Magnesium stearate | 0.400 |
| Polyvinylpyrrolidone solution—5% in 50/50 methanol-water. | |

The furazolidone, iron and calcium sulfate dihydrate powders are mixed and granulated with the polyvinylpyrrolidone solution. The wetted powders are passed through a #6 screen and dried overnight at 120° F. The dried granules are passed through a #14 screen and mixed with the magnesium stearate. The mixture is then compressed into boluses using oval shaped punches and die. The finished tablet weighs 12.8 grams.

EXAMPLE 3

| Ingredients: | Grams/bolus |
| --- | --- |
| Sulfathiazole | 4.00 |
| Reduced iron | 2.00 |
| Stearic acid | 0.180 |
| Gelatin solution, 10%. | |

The sulfathiazole and iron powder are mixed and granulated with the 10% gelatin solution. The wetted powders are passed through a #4 screen and dried overnight at 120° F. The dried granules are passed through a #12 screen and mixed with the stearic acid. The mixture is then compressed into the desired shape bolus. The finished bolus weighs 7.15 grams.

EXAMPLE 4

| Ingredients: | Grams/bolus |
| --- | --- |
| Sulfamethazine | 22.55 |
| Reduced iron | 11.27 |
| Magnesium stearate | 0.88 |
| Sodium chloride | 1.77 |
| Polyvinylpyrrolidone | 1.75 |

The polyvinylpyrrolidone is dissolved in water. The sulfamethazine and iron are mixed and granulated. The wetted powders are passed through a #4 screen and dried overnight at 120° F. The dried granules are passed through a #12 screen and mixed with the magnesium stearate and sodium chloride. The mixture is then compressed into the desired shape bolus.

EXAMPLE 5

| Ingredients: | Grams/bolus |
| --- | --- |
| Chloramphenicol palmitate | 7.50 |
| Calcium sulfate dihydrate | 25.00 |
| Talc | 0.88 |
| Gelatin solution, 10%. | |

The chloramphenicol palmitate and calcium sulfate are mixed and granulated with the gelatin solution. The granules are passed through a #14 screen and dried overnight. The dried granules are passed through a #12 screen and mixed with the talc. The mixture is then compressed into the desired shape bolus.

EXAMPLE 6

| Ingredients: | Grams/bolus |
| --- | --- |
| Sulfamethazine | 19.25 |
| Sulfathiazole | 2.25 |
| Reduced iron | 11.50 |
| Paraffin | 1.20 |
| Gelatin solution. | |

The sulfamethazine and sulfathiazole are mixed with the iron powder and granulated with gelatin solution. The wetted powders are passed through a #4 screen and dried overnight at 120° F. The dried granules are passed through a #12 screen and mixed with paraffin. The mixture is then compressed into the desired shape bolus.

What is claimed is:

1. A controlled release veterinary compressed bolus which has not been baked, fired or otherwise heated after compression and which will disintegrate in the rumen in 10 days or less and thereby permit virtual clearance of medicament from animal tissues in about three weeks for orally dosing ruminants consisting essentially of a dense filler matrix, a therapeutically active substance giving an effective blood level of animal medicament dispersed uniformly therein with sufficient pharmaceutical granulation binder to insure adequate cohesion of the bolus and from about 2.5% to about 3.5% of a stearate, stearic acid, talc or paraffin water insoluble lubricant, said bolus having sufficient dimensions, weight and density to remain lodged in the rumeno-reticular sac, and therein releasing said medicament at a rate of release giving necessary levels for a proper sustained release treatment of the animal, said release rate being slower than that provided for said medicament by 0.5% of said lubricant but faster than the release rate provided said medicament by 4.0% of said lubricant.

2. The veterinary bolus of claim 1 wherein the lubricant is a stearate.

3. The veterinary bolus of claim 1 wherein the lubricant is magnesium stearate.

4. The veterinary bolus of claim 1 wherein the therapeutically active substance is a sulfonamide or antibiotic and the filler matrix is iron powder or calcium sulfate dihydrate.

5. The veterinary bolus of claim 1 wherein the therapeutically active substance is sulfamethazine and the filler matrix is iron powder.

6. A controlled release veterinary bolus for ruminants in accordance with claim 1 wherein said bolus weighs from about 5.0 grams to about 40 grams with a density of from about 1.5 to 5.0.

7. The veterinary bolus of claim 6 wherein the lubricant is stearate.

8. The veterinary bolus of claim 6 wherein the lubricant is magnesium stearate.

9. The veterinary bolus of claim 6 wherein the therapeutically active substance is a sulfonamide or antibiotic and the filler matrix is iron powder or calcium sulfate dihydrate.

10. The veterinary bolus of claim 6 wherein the therapeutically active substance is sulfamethazine and the filler matrix is iron powder.

11. In a method of administering a necessary blood level of a medicament from a controlled release ruminant bolus for food producing ruminants several weeks before slaughtering wherein the bolus will disintegrate in the rumen in up to about ten days and proper blood level of medicament present will be essentially clear of animal tissues at time of slaughtering the improvement which consists of the step of administering to said ruminant prior to slaughtering a sustained release veterinary bolus for ruminants prepared by a method which comprises granulating a dense filler matrix intimately mixed with sufficient pharmaceutical granulation binder to insure adequate cohesion of the bolus with a therapeutically active substance, drying the resulting granulation, uniformly adding from about 2.5% to about 3.5% of a water insoluble stearate, stearic acid, talc or paraffin lubricant to the dried granulation and compressing the resulting mixture into the bolus as recited in claim 1 without thereafter baking, firing or heating the compressed bolus.

12. The method of claim 11 wherein the lubricant is magnesium stearate.

13. The method of claim 11 wherein the therapeutically active substance is a sulfonamide or antibiotic and the filler matrix is iron powder or calcium sulfate dihydrate.

14. The method of claim 11 wherein the therapeutically acitve substance is sulfamethazine and the filler matrix is iron powder.

References Cited

UNITED STATES PATENTS

| | | | |
|---|---|---|---|
| 3,056,724 | 10/1962 | Marston | 424—22 |
| 3,382,150 | 5/1968 | Grass et al. | 424—23 |

FOREIGN PATENTS 936,386  9/1963  Great Britain.

OTHER REFERENCES

Dewey et al.: Nature 181 (4620): 1367–1371 May 17, 1958, "Provision of Cobalt to Ruminants By Means of Heavy Pellets."

Skerman et al.: Am. J. Vet. Res. 20: 977–984, November 1959, "The Correction of Cobalt or Vitamin $B_{12}$ Deficiency in Cattle By Cobalt Pellet Therapy."

Little et al.: Tablet Making (2nd ed. 1963) pub. Northern Publ. Co. Ltd., Liverpool, England, pp. 63–65.

SHEP K. ROSE, Primary Examiner

U.S. Cl. X.R.

424—229